US007287279B2

(12) United States Patent
Bertman et al.

(10) Patent No.: US 7,287,279 B2
(45) Date of Patent: Oct. 23, 2007

(54) SYSTEM AND METHOD FOR LOCATING MALWARE

(75) Inventors: Justin R. Bertman, Erie, CO (US); Bryan M. Liston, Longmont, CO (US); Matthew L. Boney, Longmont, CO (US)

(73) Assignee: Webroot Software, Inc., Boulder, CO (US)

( * ) Notice: Subject to any disclaimer, the term of this patent is extended or adjusted under 35 U.S.C. 154(b) by 0 days.

(21) Appl. No.: 10/956,274

(22) Filed: Oct. 1, 2004

(65) Prior Publication Data

US 2006/0075500 A1    Apr. 6, 2006

(51) Int. Cl.
*G08B 23/00* (2006.01)
(52) U.S. Cl. ................ 726/23; 726/24; 382/103; 715/736
(58) Field of Classification Search ........ 713/165; 709/224, 232, 238; 715/736, 749, 760, 238, 715/700; 726/22–24; 382/100, 103
See application file for complete search history.

(56) References Cited

U.S. PATENT DOCUMENTS

| | | | |
|---|---|---|---|
| 5,623,600 A | 4/1997 | Ji et al. | |
| 5,920,696 A * | 7/1999 | Brandt et al. | ............... 709/218 |
| 6,069,628 A | 5/2000 | Farry et al. | |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,310,630 B1 | 10/2001 | Kulkarni et al. | |
| 6,397,264 B1 | 5/2002 | Stasnick et al. | |
| 6,460,060 B1 | 10/2002 | Maddalozzo, Jr. et al. | |
| 6,480,962 B1 | 11/2002 | Touboul | |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 * | 3/2004 | Balasubramaniam et al. | . 726/25 |
| 6,785,732 B1 * | 8/2004 | Bates et al. | .................. 709/232 |
| 6,804,780 B1 | 10/2004 | Touboul | |
| 6,813,711 B1 | 11/2004 | Dimenstein | |
| 6,829,654 B1 * | 12/2004 | Jungck | ....................... 709/246 |
| 6,965,968 B1 | 11/2005 | Touboul | |
| 7,058,822 B2 | 6/2006 | Edery et al. | |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |

(Continued)

OTHER PUBLICATIONS

U.S. Appl. No. 10/956,818, filed Oct. 1, 2004, Matthew Boney.

(Continued)

*Primary Examiner*—T. B. Truong
(74) *Attorney, Agent, or Firm*—Cooley Godward Kronish LLP

(57) ABSTRACT

A system and method for managing malware is described. One embodiment is designed to receive an initial URL associated with a Web site; download content from that Web site; identify any obfuscation techniques used to hide malware or pointers to malware; interpret those obfuscation techniques; identify a new URL as a result of interpreting the obfuscation techniques; and add the new URL to a URL database.

12 Claims, 5 Drawing Sheets

U.S. PATENT DOCUMENTS

| | | | |
|---|---|---|---|
| 2004/0143763 | A1 | 7/2004 | Radatti |
| 2004/0187023 | A1 | 9/2004 | Alagna et al. |
| 2004/0225877 | A1 | 11/2004 | Huang |
| 2005/0038697 | A1* | 2/2005 | Aaron .......................... 705/14 |
| 2005/0138433 | A1 | 6/2005 | Linetsky |

OTHER PUBLICATIONS

U.S. Appl. No. 10/956,575, filed Oct. 1, 2004, Matthew Boney.
U.S. Appl. No. 11/079,417, filed Mar. 14, 2005, Justin Ryan Bertman.
U.S. Appl. No. 11/171,924, filed Jul. 1, 2005, Paul Piccard.
U.S. Appl. No. 11/199,468, filed Aug. 8, 2005, Philip Maddaloni.
U.S. Appl. No. 11/180,161, filed Jul. 13, 2005, Paul L. Piccard et al.
U.S. Appl. No. 11/408,215, filed Apr. 20, 2006, Matthew Boney.
U.S. Appl. No. 11/408,146, filed Apr. 20, 2006, Matthew Boney.
U.S. Appl. No. 11/408,145, filed Apr. 20, 2006, Matthew Boney.
U.S. Appl. No. 11/462,781, filed Aug. 7, 2006, Harry M. McCloy et al.

Codeguru, Three Ways to Inject Your Code Into Another Process, by Robert Kuster, Aug. 4, 2003, 22 pgs.
Codeguru, Managing Low-Level Keyboard Hooks With The Windows API for VB .Net, by Paul Kimmel, Apr. 18, 2004, 10 pgs.
Codeguru, Hooking The Keyboard, by Anoop Thomas, Dec. 13, 2001, 6 pgs.
Illusive Security, Wolves In Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, pgs.
Microsoft.com, How To Subclass A Window in Windows 95, Article ID 125680, Jul. 11, 2005, 2005, 2 pgs.
MSDN, Win32 Hooks by Kyle Marsh, Jul 29, 1993, 15 pgs.
PCT Search Report, PCT/US05/34874, Jul. 5, 2006, 7 Pages.

\* cited by examiner

SYSTEM AND METHOD FOR LOCATING MALWARE

RELATED APPLICATIONS

The present application is related to commonly owned and assigned application Ser. No. 10/956,818, entitled System and Method for Actively Operating Malware to Generate a Definition, which is incorporated herein by reference.

The present application is related to commonly owned and assigned application Ser. No. 10/956,575, entitled System and Method for Locating Malware to Generate a Definition, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to systems and methods for locating and identifying malware. In particular, but not by way of limitation, the present invention relates to systems and methods for searching out malware and generating corresponding malware definitions.

BACKGROUND OF THE INVENTION

Personal computers and business computers are continually attacked by trojans, spyware, and adware, collectively referred to as "malware" or "spyware." These types of programs generally act to gather information about a person or organization—often without the person or organization's knowledge. Some malware is highly malicious. Other malware is non-malicious but may cause issues with privacy or system performance. And yet other malware is actually beneficial or wanted by the user. Unless specified otherwise, "malware" as used herein refers to any of these programs that collects information about a person or an organization.

Software is presently available to detect and remove malware. But as it evolves, the software to detect and remove it must also evolve. Accordingly, current techniques and software for removing malware are not always satisfactory and will most certainly not be satisfactory in the future. Additionally, because some malware is actually valuable to a user, malware-detection software should, in some cases, be able to handle differences between wanted and unwanted malware.

Current malware removal software uses definitions of known malware to search for and remove files on a protected system. These definitions are often slow and cumbersome to create. Additionally, it is often difficult to initially locate the malware in order to create the definitions. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present system provides a system and method for managing malware. One embodiment is designed to receive an initial URL associated with a Web site; download content from that Web site; identify any obfuscation techniques used to hide malware or pointers to malware; interpret those obfuscation techniques; identify a new URL as a result of interpreting the obfuscation techniques; and add the new URL to a URL database.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
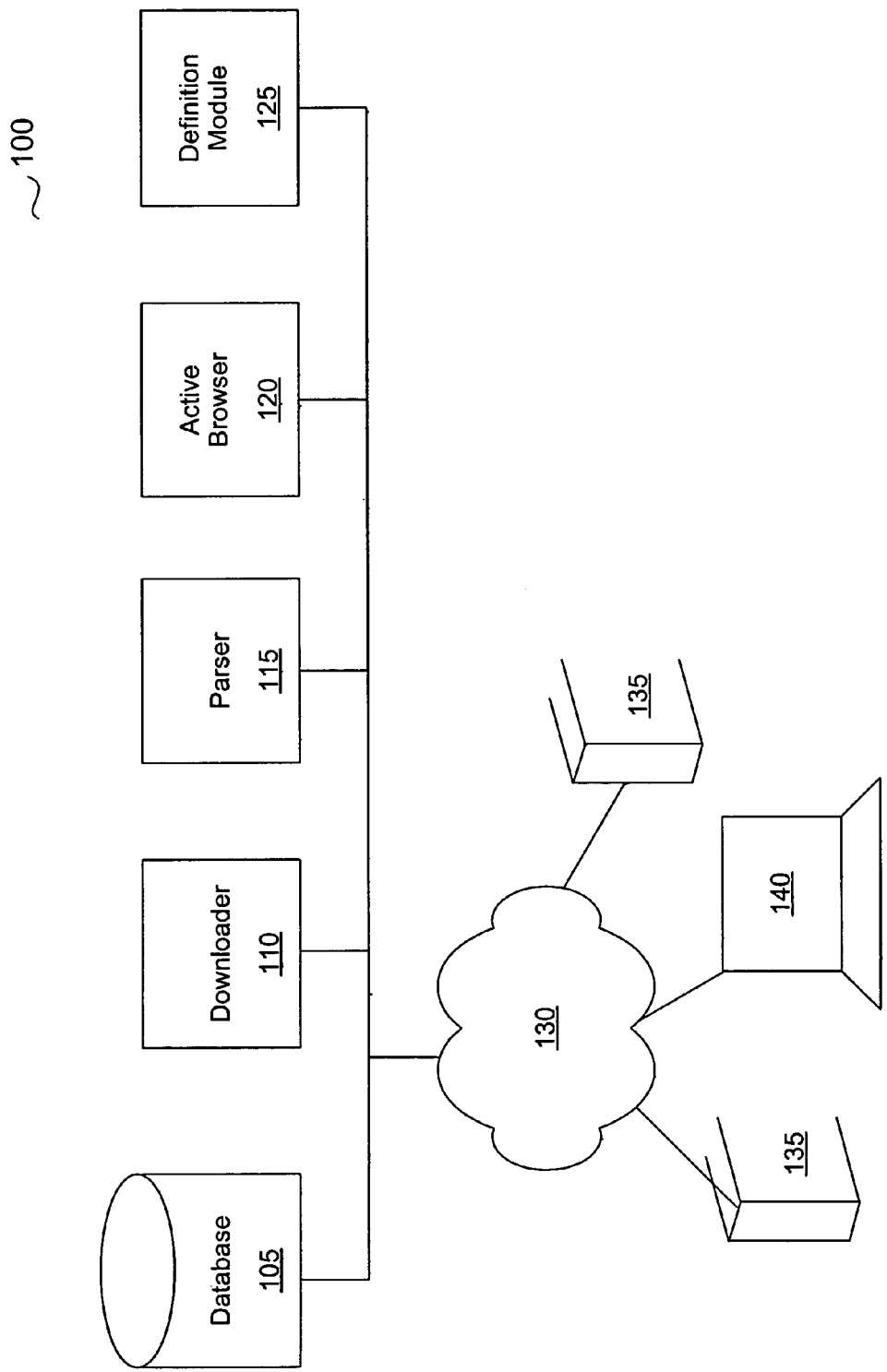
FIG. 1 is a block diagram of one embodiment of the present invention.

Referring now to the drawings, where like or similar elements are designated with identical reference numerals throughout the several views, and referring in particular to FIG. 1, it is a block diagram of one embodiment 100 of the present invention. This embodiment includes a database 105, a downloader 110, a parser 115, an active browser 120, and a definition module 125. These components, which are described below, are connected through a network 130 to Web servers 135 and protected computers 140. These components are described briefly with regard to FIG. 1, and their operation is further described in the description accompanying FIGS. 2 through 5.

The database system 105 of FIG. 1 can be built on an ORACLE platform or any other database platform and can include several tables or be divided into separate database systems. But assuming that the database 105 is a single database with multiple tables, the tables can be generally categorized as URLs to search, downloaded HTML, downloaded targets, and definitions. (As used herein, "targets" refers to any program, program trace, file, object, exploits, malware activity, or URL that corresponds to malware.)

The URL tables store a list of URLs that should be searched for malware. The URL tables can be populated by crawling the Internet and storing any found links. When searching for URLs linked to malware, the techniques used to identify those URLs sometimes differ from those used by popular search engines such as GOOGLE. For example, malware distributors often try to hide their URLs rather than have them pushed out to the public. GOOGLE's crawling techniques and similar techniques look for these high-traffic links and often miss deliberately-hidden URLs. Embodiments of the present invention, however, specifically seek out hidden URLs, and these techniques are described in more detail below.

In one embodiment, the URLs stored in the URL tables can be stored in association with corresponding data such as a time stamp identifying the last time the URL was accessed, a priority level indicating when to access the URL again, etc. For example, the priority level corresponding to CNN.COM would likely be low because the likelihood of finding malware on a trusted cite like CNN.COM is low. On the other hand, the likelihood of finding malware on a pornography-related site is much higher, so the priority level for the related URL could be set to a high level.

Another table in the database can store HTML code or pointers to the HTML code downloaded from a URL in the URL table. This downloaded HTML code can be used for statistical purposes and for analysis purposes. For example, a hash value can be calculated and stored in association with the HTML code corresponding to a particular URL. When the same URL is accessed again, the HTML code can be downloaded again and the new hash value calculated. If the hash value for both downloads is the same, then the content at that URL has not changed and further processing is not necessarily required.

Two other tables in the database relate to identified malware or targets. (Collectively referred to as a "target.") One table can store the code and/or URL associated with any identified target. And the other table can store the definitions related to a target. These definitions, which are discussed in more detail below, can include a list of the activity caused by the target, a hash function of actual malware code, the actual malware code, etc.

Referring now to the downloader 110 in FIG. 1, it retrieves the code associated with a particular URL. For example, the downloader 110 selects a URL from the database and identifies the IP address corresponding to the URL. The downloader 110 then forms and sends a requests to the IP address for the URL. For speed reasons, the downloader 110 may focus its efforts on the HTML, JavaScript, applets, and objects corresponding to the URL. Although this document often discusses HTML, JavaScript, and Java applets, those of skill in the art can understand that embodiments of the present invention can operate on any object within a Web page, including other types of markup languages, other types of script languages, any applet programs such as ACTIVEX from MICROSOFT, and any other downloaded objects. When these specific terms are used, they should be understood to also include generic versions and other vendor versions.

Once the requested information from the URL is received by the downloader 110, the downloader 110 can send it to the database for storage. In certain embodiments, the downloader 110 can open multiple sockets to handle multiple data paths for faster downloading.

Referring now to the parser 115 shown in FIG. 1, it is responsible for searching downloaded material for malware and possible pointers to other malware. And when the parser 115 discovers potential malware, the relevant information is provided to the active browser 120 for verification of whether or not it is actually malware.

This embodiment of the parser 115 includes three individual parsers: an HTML parser, a JavaScript parser, and a form parser. The HTML parser is responsible for crawling HTML code corresponding to a URL and locating embedded URLs. The JavaScript parser parses JavaScript, or any script language, embedded in downloaded Web pages to identify embedded URLs and other potential malware. And the form parser identifies forms and fields in downloaded material that require user input for further navigation.

Referring first to the URL parser, it can operate much as a typical Web crawler and traverse links in a Web page. It is generally handed a top level link and instructed to crawl starting at that top level link. Any discovered URLs can be added to the URL table in the database 105.

The parser 115 can also store a priority indication with any URL. The priority indication can indicate the likelihood that the URL will point to content or other URLs that include malware. For example, the priority indication could be based on whether malware was previously found using this URL. In other embodiments, the priority indication is based on whether a URL included links to other malware sites. And in yet other embodiments, the priority indication can indicate how often the URL should be searched. Trusted cites such as CNN.COM, for example, do not need to be searched regularly for malware.

As for the JavaScript parser, it parses (decodes) JavaScript, or other scripts, embedded in downloaded Web pages so that embedded URLs and other potential malware can be more easily identified. For example, the JavaScript parser can decode obfuscation techniques used by malware programmers to hide their malware from identification.

In one embodiment, the JavaScript parser uses a JavaScript interpreter such as the Mozilla browser to identify embedded URLs or hidden malware. For example, the JavaScript interpreter could decode URL addresses that are obfuscated in the JavaScript through the use of ASCII characters or hexadecimal encoding. Similarly, the JavaScript interpreter could decode actual JavaScript programs that have been obfuscated. In essence, the JavaScript interpreter is undoing the tricks used by malware programmers to hide their malware. And once the tricks have been removed, the interpreted code can be searched for text strings and URLs related to malware.

Obfuscation techniques, such as using hexadecimal or ASCII codes to represent text strings, generally indicate the presence of malware. Accordingly, obfuscated URLs can be added to the URL database and indicated as a high priority URL for subsequent crawling. These URLs could also be passed to the active browser immediately so that a malware definition can be generated if necessary. Similarly, other obfuscated JavaScript can be passed to the active browser 120 as potential malware or otherwise flagged.

The form parser identifies forms and fields in downloaded material that require user input for further navigation. For some forms and fields, the form parser can follow the branches embedded in the JavaScript. For other forms and fields, the parser passes the URL associated with the forms or field to the active browser 120 for complete navigation.

The form parser's main goal is to identify anything that could be or could contain malware. This includes, but is not limited to, finding submit forms, button click events, and evaluation statements that could lead to malware being installed on the host machine. Anything that is not able to be verified by the form parser can be sent to the active browser 120 for further inspection. For example, button click events that run a function rather than submitting information could be sent to the active browser 120. Similarly, if a field is checked by server side JavaScript and requires formatted input, like a phone number that requires parenthesis around the area code, then this type of form could be sent to the active browser 120.

Referring now to the active browser 120 shown in FIG. 1, it is designed to automatically surf a Web site associated with a URL retrieved from the URL database or passed from the parser 115. In essence, the active browser 120 surfs a Web site as a person would. The active browser 120 generally follows each possible path on the Web site and if necessary, populates any forms, fields, or check boxes to fully navigate the site.

The active browser 120 generally operates on a clean computer system with a known configuration. For example, the active browser 120 could operate on a WINDOWS-based system that operates INTERNET EXPLORER. It could also operate on a Linux-based system operating a Mozilla browser.

As the active browser 120 navigates a Web site, any changes to the configuration of the active browser's computer system are recorded. "Changes" refers to any type of change to the computer system including, changes to a operating system file, addition or removal of files, changing file names, changing the browser configuration, opening communication ports, etc. For example, a configuration change could include a change to the WINDOWS registry file or any similar file for other operating systems. For clarity, the term "registry file" refers to the WINDOWS registry file and any similar type of file, whether for earlier WINDOWS versions or other operating systems, including Linux.

And finally, the definition module 125 shown in FIG. 1 is responsible for generating malware definitions that are stored in the database and eventually pushed to the protected computers 140. The definition module 125 can determine which of these changes are associated with malware and which are associated with acceptable activities. For example, the malware definition module 125 could use a series of shields to detect suspicious activities on the active browser 120. The potential malware associated with acceptable activities can be discarded.

Figure 2:
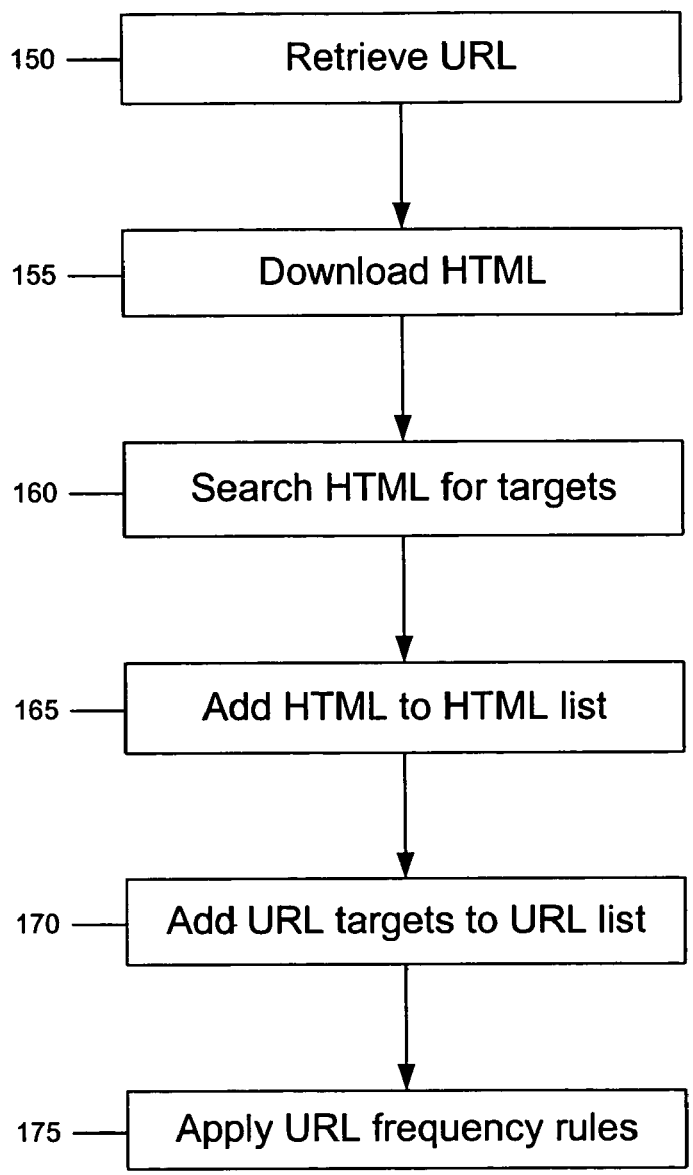
FIG. 2 is a flowchart of one method for identifying URLs that may be associated with malware.

Referring now to FIG. 2, it is a flowchart of one method 145 for identifying URLs that may be associated with malware. Although this method is not necessarily tied to the architecture shown in claim 1, for convenience and clarity, that architecture is sometimes referred to when describing the method.

For the method of FIG. 2, the downloader initially retrieves or otherwise obtains a URL from the database. (Block 150) Typically, the downloader retrieves a high-priority URL or a batch of high-priority URLs. The downloader then retrieves the material, usually a Web page or HTML, associated with the URL. (Block 155) Before further processing the downloaded material, the downloader can compare the material against previously downloaded material from the same URL. For example, the downloader could calculate a cyclic redundancy code (CRC), or some other hash function value, for the downloaded material and compare it against the CRC for the previously downloaded material. If the CRCs match, then the newly downloaded material can be discarded without further processing. But if the two CRCs do not match, then the newly downloaded material is different and should be passed on for further processing.

Assuming that the downloaded page requires further processing, the downloaded material, usually HTML and JavaScript, can be stored in the database 105. (Block 165) It can also be searched for targets such as embedded URLs, JavaScript, potential targets, etc. (Block 160) When it discovers new URLs, they can be stored and a priority indicator can also be calculated for those URLs. (Blocks 170 and 175) For example, URLs mined from trusted Web sites could be given a low priority. Similarly, URLs that were obfuscated in downloaded material or found at a pornography Web site could be given a high priority. The identified URLs and the corresponding priority data can be stored in the URL table in the database 105. These URLs can subsequently be downloaded and searched.

Figure 3:
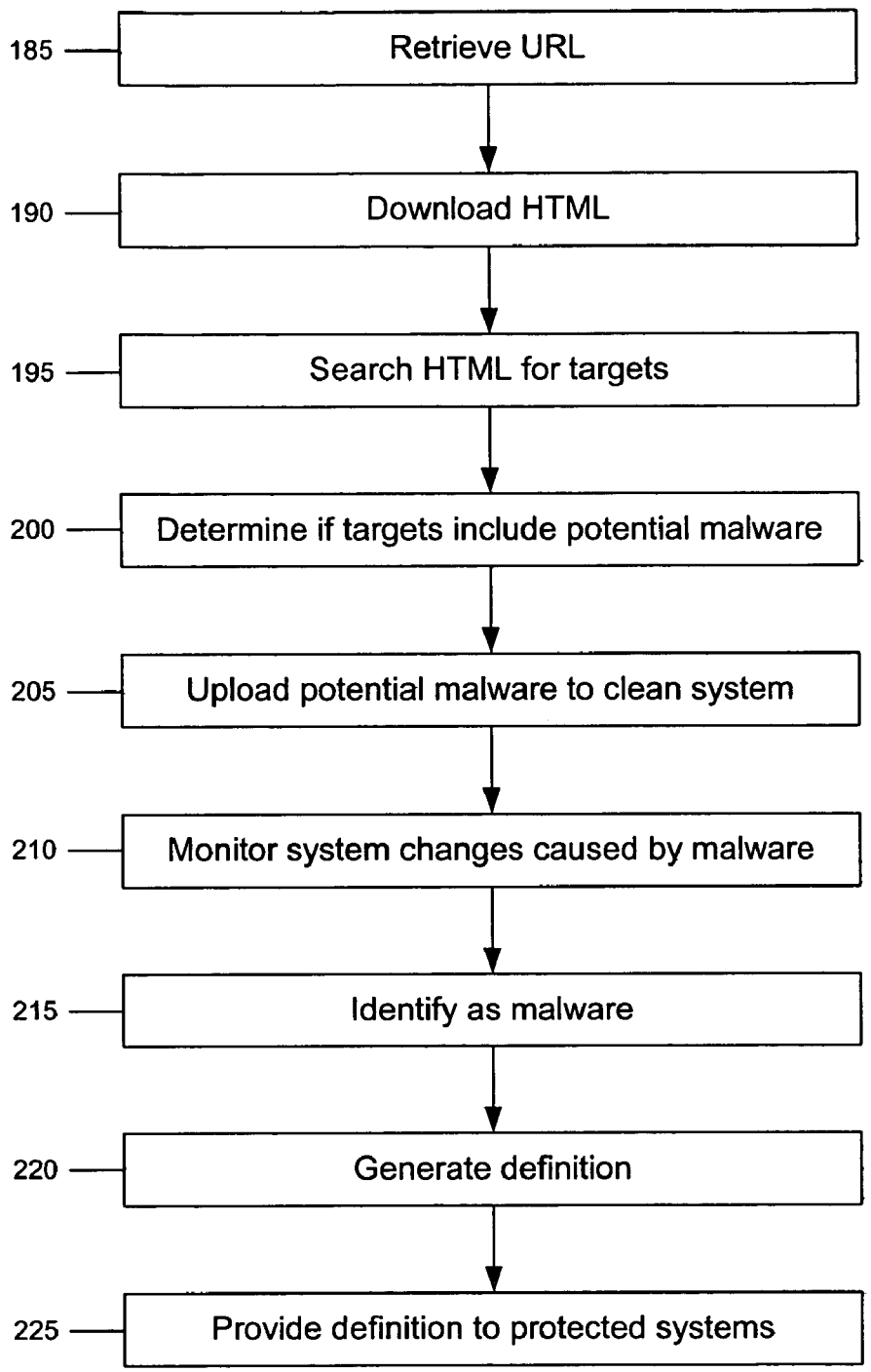
FIG. 3 is a flowchart of one method for generating malware definitions.

Referring now to FIG. 3, it is a flowchart of one method 180 for generating malware definitions. This method is similar to the one described with respect to FIG. 2. For example, this method begins by retrieving a URL or batch of URLs and the associated material. (Blocks 185 and 190) The retrieved material is then searched for potential targets. (Block 195) For example, the material can be searched for JavaScript and/or obfuscation techniques. (Block 200)

Any potential targets are uploaded and executed on the active browser. (Block 205) If the potential malware makes changes to the active browser, then those changes are recorded and used to determine whether the potential malware is actually malware. (Blocks 210 and 215) For example, the changes could be compared against approved changes from approved software applications. (Discussed in detail with relation to FIG. 4.) In a second method, any changes to the active browser could be scanned by a series of shields that monitor for basic behavior indicative of malware. For example, shields can watch for the installation of programs, alteration of the registry file, attempts to access email programs, etc. Typical shields include:

Favorites Shield—The favorites shield monitors for any changes to a browser's list of favorite Web sites.

Browser-Hijack Shield—The browser-hijack shield monitors the WINDOWS registry file for changes to any default Web pages or other user preferences. For example, the browser-hijack shield could watch for changes to the default search page stored in the registry file.

Host-File Shield—The host-file shield monitors the host file for changes to DNS addresses. For example, some malware will alter the address in the host file for yahoo.com to point to an ad site. Thus, when a user types in yahoo.com, the user will be redirected to the ad site instead of yahoo's home page.

Cookie Shield—The cookie shield monitors for third-party cookies being placed on the protected computer. These third-party cookies are generally the type of cookie that relay information about Web-surfing habits to an ad site.

Homepage Shield—The homepage shield monitors the identification of a user's homepage and detects any attempt to change it.

Plug-in Shield—This shield monitors for the installation of plug-ins. For example, the plug-in shield looks for processes that attach to browsers and then communicate through the browser. Plug-in shields can monitor for the installation of any plug-in or can compare a plug-in to a malware definition. For example, this shield could monitor for the installation of INTERNET EXPLORER Browser Help Objects Zombie shield—The zombie shield monitors for malware activity that indicates a protected computer is being used unknowingly to send out spam or email attacks. The zombie shield generally monitors for the sending of a threshold number of emails in a set period of time. For example, if ten emails are sent out in a minute, then the user could be notified and user approval required for further emails to go out. Similarly, if the user's address book is accesses a threshold number of times in a set period, then the user could be notified and any outgoing email blocked until the user gives approval. And in another implementation, the zombie shield can monitor for data communications when the system should otherwise be idle.

Startup shield—The startup shield monitors the run folder in the WINDOWS registry for the addition of any program. It can also monitor similar folders, including Run Once, Run OnceEX, and Run Services in WINDOWS-based systems. And those of skill in the art can recognize that this shield can monitor similar folders in Unix, Linux, and other types of systems.

WINDOWS-messenger shield—The WINDOWS-messenger shield watches for any attempts to turn on WINDOWS messenger.

Installation shield—The installation shield intercepts the CreateProcess operating system call that is used to start up any new process. This shield compares the process that is attempting to run against the definitions for known malware.

Memory shield—The memory shield is similar to the installation shield. The memory-shield scans through running processes matching each against the known definitions and notifies the user if there is a spy running.

Communication shield—The communication shield scans for and blocks traffic to and from IP addresses associated with a known malware site. The IP addresses for these sites can be stored on a URL/IP blacklist. This shield can also scan packets for embedded IP addresses and determine whether those addresses are included on a blacklist or white list. In another implementation, the communication shield checks for certain types of communications being transmitted to an outside IP address. For example, the shield may monitor for information that has been tagged as private.

The communication shield could also inspect packets that are coming in from an outside source to determine if they contain any malware traces. For example, this shield could collect packets as they are coming in and will compare them to known definitions before letting them through. The shield would then block any that are associated with known malware.

Key-logger shield—The key-logger shield monitors for malware that captures are reports out key strokes by comparing programs against definitions of known key-logger programs. The key-logger shield, in some implementations, can also monitor for applications that are logging keystrokes—independent of any malware definitions. In these types of systems, the shield stores a list of known good programs that can legitimately log keystrokes. And if any application not on this list is discovered logging keystrokes, it is targeted for shut down and removal. Similarly, any key-logging application that is discovered through the definition process is targeted for shut down and removal. The key-logger shield could be incorporated into other shields and does not need to be a stand-alone shield.

Still referring to FIG. 3, once potential malware has been identified as actual malware, a malware definition can be generated. (Block 220) The definition can be based on the changes that the malware caused at the active browser 120. For example, if the malware made certain changes to the registry file, then those changes can be added to the definition for that exploit. Protected computers can then be told to look for this type of registry change. Text strings associated with offending JavaScript can also be stored in the definition. Similarly, applets, executable files, objects, and similar files can be added to the definitions.

Once a definition is generated for certain malware, that definition can be stored in the database and then pushed to the protected computer systems. (Block 225) This process of generating definitions is described with regard to FIG. 4.

Figure 4:
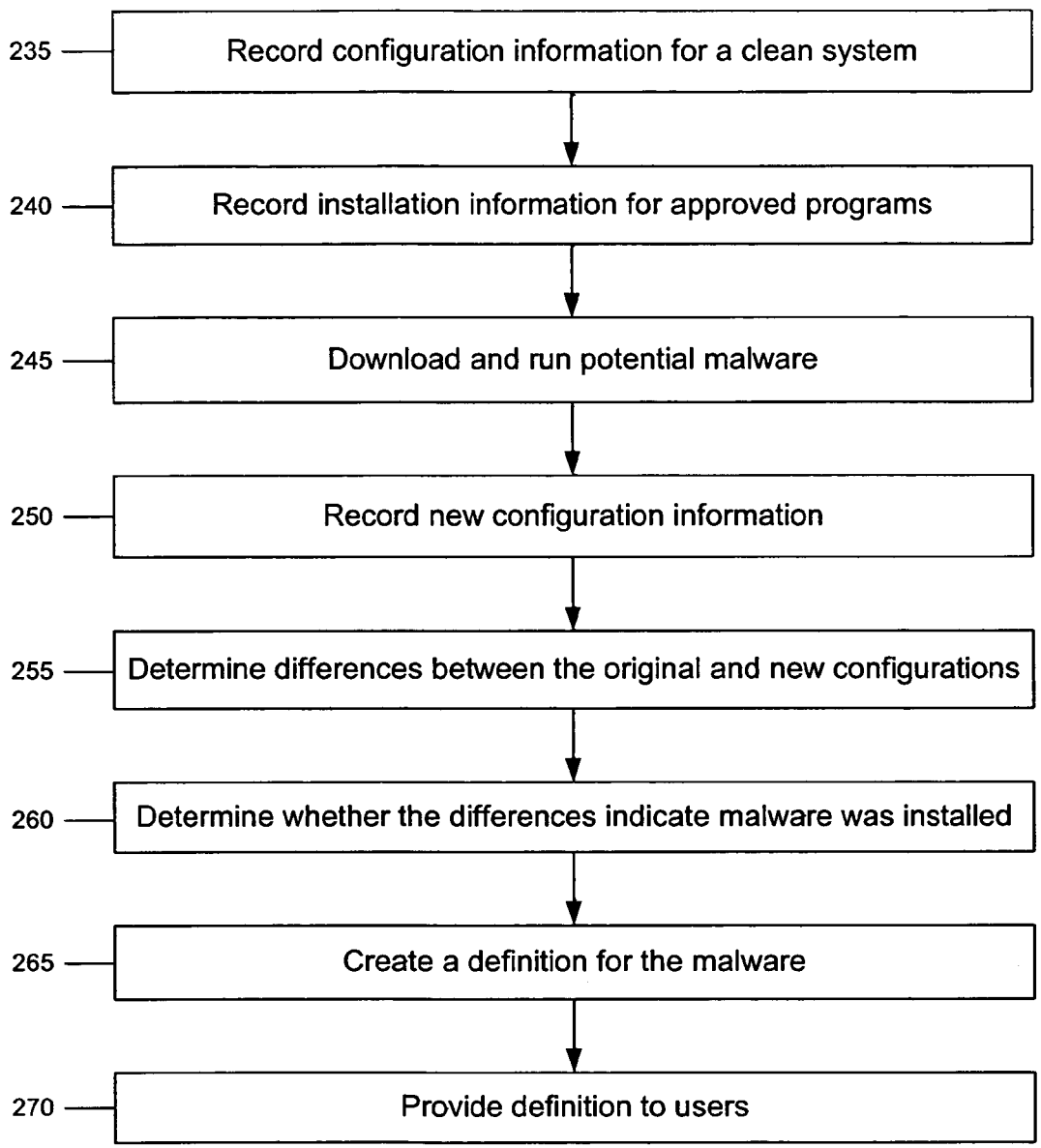
FIG. 4 is a flowchart of one method for actively browsing a Web site to identify targets.

Referring now to FIG. 4, it is a flowchart of one method 230 for actively browsing a Web site to identify potential malware. In this method, the active browser 120, or another clean computer system, is initially scanned and the configuration information recorded. (Block 235) For example, the initial scan could record the registry file data, installed files, programs in memory, browser setup, operating system (OS) setup, etc. Next, changes to the configuration information caused by installing approved programs can be identified and stored as part of the active-browser baseline. (Block 240) For example, the configuration changes caused by installing ADOBE ACROBAT could be identified and stored. And when the change information is aggregated together for each of the approved programs, the baseline for an approved system is generated.

The baseline for the clean system can be compared against changes caused by malware programs. For example, when the parser passes a URL to the active browser, the active browser 120 browses the associated Web site as a person would. And consequently, any malware that would be installed on a user's computer is installed on the active browser. The identity of any installed programs would then be recorded.

After the potential malware has been installed or executed on the active browser 120, the active browser's behavior can be monitored. (Block 245) For example, outbound communications initiated by the installed malware can be monitored. Additionally, any changes to the configuration for the active browser can be identified by comparing the system after installation against the records for the baseline system. (Blocks 250 and 255) The identified changes can then be used to evaluate whether a malware definition should be created for this activity. (Block 260) Again, shields could be used to evaluate the potential malware activity.

To avoid creating multiple malware definitions for the same malware, the identified changes to the active browser can be compared against changes made by previously tested programs. If the new changes match previous changes, then a definition should already be on file. Additionally, file names for newly downloaded malware can be compared against file names for previously detected malware. If the names match, then a definition should already be on file. And in yet another embodiment, a hash function value can be calculated for any newly downloaded malware file and it can be compared against the hash function value for known malware programs. If the hash function values match, then a definition should already be on file.

If the newly downloaded malware program is not linked with an existing malware definition, then a new definition is created. (Block 265) The changes to the active browser are generally associated with that definition. For example, the file names for any installed programs can be recorded in the definition. Similarly, any changes to the registry file can be recorded in the definition. And if any actual files were installed, the files and/or a corresponding hash function value for the file can be recorded in the definition.

Once a definition has been created, all or portions of it can be pushed to the protected computer systems. (Block 270) Thus, the protected computer systems can receive prompt definition updates.

Figure 5:
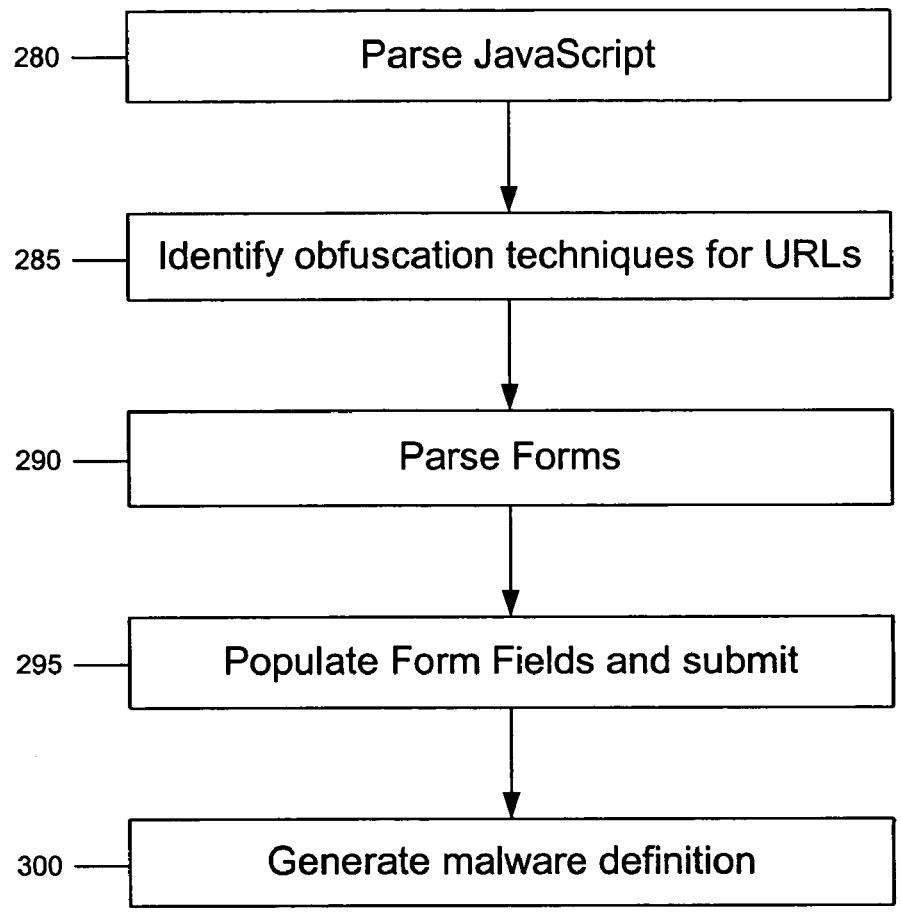
FIG. 5 is a flowchart of one method for searching for malware targets in JavaScript and forms.

Referring now to FIG. 5, it is a flowchart of one method 275 for parsing forms and JavaScript (and similar script languages) to identify malware. In this method, JavaScript embedded in downloaded material is parsed and searched for potential targets or links to potential targets. (Block 280) Because malware-related material, such as URLs and code, can be hidden within JavaScript, the JavaScript should either be interpreted with a JavaScript interpreter or otherwise searched for hidden data.

A typical JavaScript parser is Mozilla provided by the Mozilla Foundation in Mountain View, Calif. To render the JavaScript, a parser interprets all of the code, including any code that is otherwise obfuscated. For example, JavaScript permits normal text to be represented in non-text formats such as ASCII and hexadecimal. In this non-textual format, searching for text strings or URLs related to potential malware is ineffective because the text strings and URLs have been obfuscated. But with the use of the JavaScript interpreter, these obfuscations are converted into a text-searchable format.

Any URLs that have been obfuscated can be identified as high priority and passed to the database for subsequent navigation. Similarly, when the JavaScript includes any obfuscated code, that code or the associated URL can be passed to the active browser for evaluation. And as previously described, the active browser can execute the code to see what changes it causes.

In another embodiment of the parser, when it comes across any forms that require a user to populate certain fields, then it passes the associated URL to the active browser, which can populate the fields and retrieve further information. (Blocks 290 and 295) And if the subsequent information causes changes to the active browser, then those changes would be recorded and possibly incorporated into a malware definition. (Block 300)

In conclusion, the present invention provides, among other things, a system and method for generating malware definitions. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for identifying Web sites that may include malware, the method comprising:
   receiving an initial Uniform Resource Locator (URL) associated with a Web site;
   downloading content associated with the initial URL, the content including Hyper Text Markup Language (HTML), a script program, and code related to a button-click event that executes a function;
   searching the HTML in the downloaded content for an embedded URL;
   identifying a non-obfuscated URL in the script program;
   identifying an obfuscated URL in the script program;
   executing the function corresponding to the button-click event;
   receiving a new URL as a result of executing the function;
   adding the embedded URL, the non-obfuscated URL and the new URL to a URL database; and
   adding a high-priority indicator to the URL database, the high-priority indicator corresponding to the obfuscated URL.

2. The method of claim 1, further comprising:
   searching the HTML for a text string corresponding to malware.

3. The method of claim 1, further comprising:
   searching the script program for a text string corresponding to malware.

4. The method of claim 1, further comprising:
   identifying obfuscated text strings in the script program; and
   interpreting the obfuscated text strings.

5. The method of claim 4, further comprising:
   adding the initial URL to the URL database; and
   responsive to identifying obfuscated text strings in the script program, adding a high-priority indicator to the URL database, the high-priority indicator corresponding to the initial URL.

6. A method for identifying malware, the method comprising:
   receiving an initial Uniform Resource Locator (URL) associated with a Web site;
   downloading content associated with the initial URL, the content including a script program;
   identifying obfuscation techniques in the script program;
   interpreting the obfuscation techniques;
   identifying a new URL as a result of interpreting the obfuscation techniques;
   adding the new URL to a URL database; and
   adding a high-priority indicator to the URL database, the high-priority indicator corresponding to the new URL and the high-priority indicator indicating that the new URL is likely to be associated with malware.

7. The method of claim 6, further comprising:
   downloading additional content from a Web site associated with the new URL; and
   determining whether the additional content downloaded from the Web site associated with the new URL includes malware.

8. The method of claim 6, further comprising:
   downloading additional content from the new URL;
   identifying an additional embedded link in the additional content; and adding the additional embedded link to the URL database.

9. A method for identifying malware, the method comprising:
   downloading content associated with an initial Uniform Resource Locator (URL), the content including an object and an embedded URL;
   extracting the embedded URL from the content;
   adding the extracted URL to a URL database;
   determining whether the object can be verified through text searching;
   responsive to the object not being verifiable through text searching, passing the object to an active browser configured to execute the object automatically and to record configuration changes to a computer system on which the active browser operates that occur as a result of executing the object; and
   examining the configuration changes to determine whether the object is malware.

10. The method of claim 9, wherein determining whether the object can be verified through text searching comprises:
    determining whether the object includes obfuscated text.

11. The method of claim 9, wherein determining whether the object can be verified through text searching comprises:
    determining whether the object includes a form that requires submittal to a remote computer.

12. The method of claim 9, wherein determining whether the object can be verified through text searching comprises:
    determining whether the object includes a button click event that is configured to run a function.

* * * * *